Figure 1:
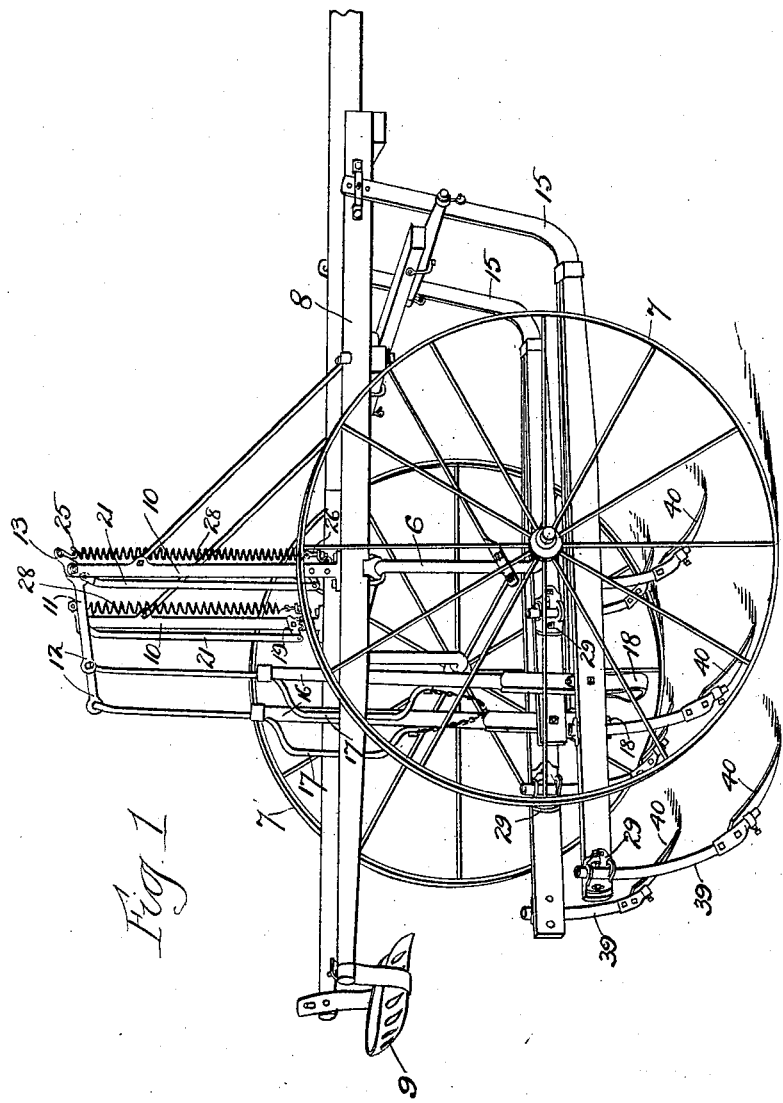

No. 616,960. Patented Jan. 3, 1899.
J. H. PATTEE.
RIDING CULTIVATOR.
(Application filed Jan. 21, 1898.)
(No Model.) 2 Sheets—Sheet 1.

Witnesses
Wm. F. Henning
Geo. M. Anderson.

Inventor
James H. Pattee,
By Bond, Adams, Pickard & Jackson.
Attys

No. 616,960. Patented Jan. 3, 1899.
J. H. PATTEE.
RIDING CULTIVATOR.
(Application filed Jan. 21, 1898.)
(No Model.) 2 Sheets—Sheet 2.
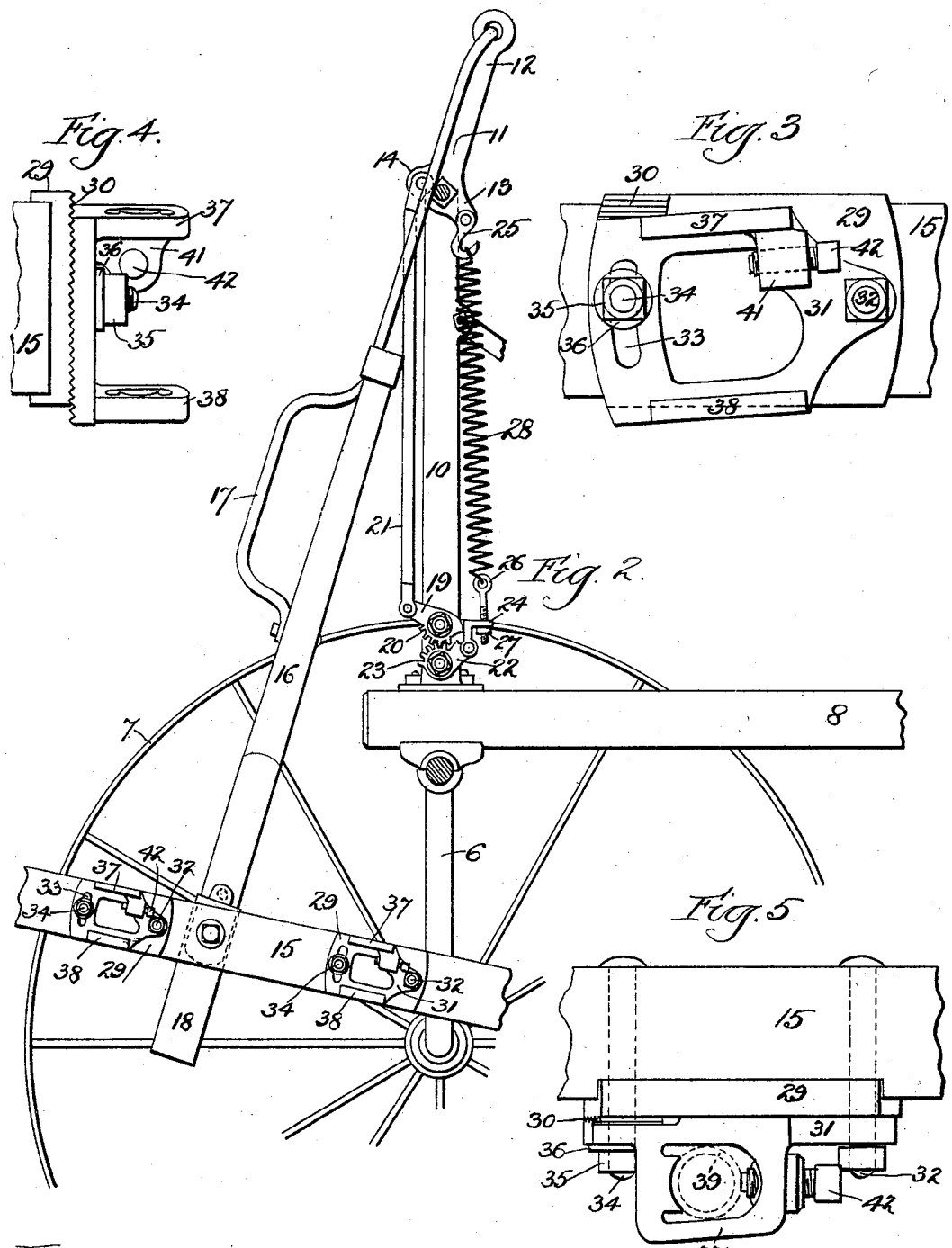
Witnesses
Inventor
James H. Pattee,
by Bond Adams Pickard Jackson
Attys

UNITED STATES PATENT OFFICE.

JAMES H. PATTEE, OF MONMOUTH, ILLINOIS, ASSIGNOR TO THE PATTEE PLOW COMPANY, OF SAME PLACE.

RIDING-CULTIVATOR.

SPECIFICATION forming part of Letters Patent No. 616,960, dated January 3, 1899.

Application filed January 21, 1898. Serial No. 667,511. (No model.)

*To all whom it may concern:*

Be it known that I, JAMES H. PATTEE, a citizen of the United States, residing at Monmouth, in the county of Warren and State of Illinois, have invented certain new and useful Improvements in Riding Straddle-Row Cultivators, of which the following is a specification.

My invention relates to riding straddle-row cultivators; and one of its objects is to provide new and improved lifting and counterbalancing mechanism for the shovel-beams, wherein the spring acts from both ends in such a way that as the leverage grows greater the force of the spring is compensated for, so that the shovel-beams and the gangs attached thereto are held in balance, whereby the operator can change their position with a very slight expenditure of force and whereby when the shovels enter the ground the lifting force of the spring is overcome to such an extent as to allow the weight of the shovel-beams and gangs to take effect in holding the shovel-beams in their downward position.

It has for a further object to provide new and improved devices for holding the shovels in such a way that they can be adjusted to and held in varying angles.

It has for a further object the improvement of riding straddle-row cultivators generally.

I accomplish these objects as hereinafter described, and illustrated in the accompanying drawings.

That which I regard as new is especially set forth in the claims.

In the accompanying drawings, Figure 1 is a side elevation. Fig. 2 is an enlarged detail showing the lifting and compensating mechanisms. Fig. 3 is an enlarged detail, being a side view of the shovel-support. Fig. 4 is an enlarged detail, being an end view of the shovel-support. Fig. 5 is an enlarged detail, being a top or plan view of the shovel-support.

In the drawings, 6 indicates an arched axle, upon which are mounted the wheels 7 7. The arched axle 6 and wheels 7 are of the usual form and construction.

8 indicates a frame which is supported upon the arched axle 6 and carries suspended from its rear end the seat 9.

10 10 indicate uprights, which are rigidly mounted upon the frame 8.

11 indicates a three-armed rock-lever provided with a long arm 12 and shorter arms 13 14. The rock-lever 11 is pivotally mounted upon the upper end of the upright 10.

15 indicates a shovel-beam which is pivotally suspended by its forward end from the frame 8, as is best shown in Fig. 1.

16 indicates a connecting-rod which is pivotally connected at its upper end with the outer end of the long arm 12 of the rock-lever 11, as is best shown in Fig. 2, and is pivotally connected at its lower end with the shovel-beam 15. The connecting-rod 16 is provided with a hand-grip 17 and with a stirrup 18, adapted to receive the foot of the operator for the purpose of assisting in the raising and lowering of the shovel-beam 15.

19 indicates a lever provided with a cog-segment 20, pivotally mounted upon the upright 10 near its lower end.

21 indicates a connecting-rod pivotally connected at its upper end with the short arm 14 of the rock-lever 11 and pivotally connected at its lower end with the lever 19, as is best shown in Fig. 2.

22 indicates a lever provided with a cog-segment 23 and pivotally mounted upon the lower end of the upright 10, with its cog-segment 23 engaging with the cog-segment 20 of the lever 19.

24 indicates a bracket pivotally connected with the lever 22.

25 indicates a hook pivotally mounted upon the end of the short arm 13 of the rock-lever 11.

26 indicates a ring-bolt which passes through bracket 24 and is provided with an adjusting-nut 27.

28 indicates a retractile spring connected at its upper end with the hook 25 and at its lower end with the ring-bolt 26.

In Fig. 1 the cultivator-beams are shown lowered, with the shovels resting upon the ground, the raising and compensating devices correspondingly adjusted.

In Fig. 2 the shovel-beams are shown raised from the ground to their highest position, the lifting and compensating devices being shown in corresponding position.

The operation of the lifting and compensating devices is as follows: As the connecting-rod 16 is thrust downward by the operator from the position shown in Fig. 2, carrying with it the shovel-beam 15, the rock-lever 11 is rocked, the long arm 12 being carried backward and then backward and downward as the connecting-rod 16 descends. As this rocking increases it is obvious that the leverage upon the arm 12 increases and the weight of the shovel-beam 15 operates to increasing advantage. At the same time the short arm 14 of the lever 11 is carried downward, and by means of the connecting-rod 21 this downward movement is communicated to the lever 19. The cog-segment 20 of the lever 19 engaging with the cog-segment 23 of the lever 22 causes the lever 22 to be rocked in the opposite direction, carrying its outer end downward. At the same time the short arm 13 of the lever 11 is lifted. It will be obvious, therefore, that the retractile spring 28 is stretched in both directions by the downward movement of the lever 22 and the upward movement of the short arm 13. At the same time the leverage of the spring upon the short arm 13 increases as the arm is thrown upward and outward. This double stretching of the spring from both ends compensates for the increased leverage of the beam 15 upon the arm 12, as above described, and by means of the adjusting-nut 27 the tension of the spring may be so regulated that the double stretching of the spring constantly adjusts itself to the increasing leverage upon the arm 12, so as to counterbalance this increasing leverage and hold the beams 15 continually in a state of balance until the shovels, hereinafter described, are in the ground. As the downward movement of the shovel-beam 15 is continued it forces the shovel into the ground. The short arm 14 of the rock-lever 11 passes the line drawn between the pivotal supports of the lever 11 and the pivotal supports of the levers 19 22. As soon as the arm 14 passes this line as the connecting-rod 16 is thrust downward the balance above described ceases, and, the weight of the beams tending to draw the connecting-rod 16 still farther downward, the arm 14 is thrust forward and slightly upward, thus reversing for a short distance the movement of the lever 19, which by the engagement of the cog-segments 20 23 also reverses the movement of the lever 22 for a short distance, throwing it slightly upward. The arm 13 still continuing its upward movement tends to stretch the spring 28 still farther; but this is partially compensated for by the slightly-upward movement of the lever 22. By this action of the parts the lifting power of the spring 28 is reduced, so that the weight of the cultivator-beams slightly overcomes the lifting force of the spring and tends to slightly force the shovels into the ground.

When it is desired to lift the shovels from the ground, the operator exerts an upward pressure upon the connecting-rod 16, and the movements of the parts above described are reversed. As was said above, the force of the spring is adjusted, by means of the adjusting-nut 27, in accordance with the weight of the shovel-beams 15 and the number of shovels carried thereon.

29 indicates a plate secured to the shovel-beams 15 and provided upon its outer surface with a notched segment 30, as best shown in Figs. 3 and 4. Referring to these same figures, 31 indicates a plate which is pivotally mounted at its forward end, by a bolt 32, to the surface of the plate 29. The inner side of the plate 31 is provided with a notched segment adapted to engage with the notched segment of the plate 29. 33 indicates a slot in the plate 31, through which passes bolt 34. 35 indicates a nut screwed upon the end of the bolt 34 and bearing upon a washer 36 between the bolt 35 and the outer surface of the plate 31. By loosening the nut 35 the plate 31 can be rotated up or down upon its pivot 32, so as to put it in any desired position, and by tightening the nut 35 the notched segment of the plate 31 engages with the notched segment 30 of the plate 29, so as to hold the plate 31 fixed in its desired position. The plate 31 is provided with brackets 37 38, which are perforated to receive the shanks 39 of the cultivator-shovels 40. 41 indicates an ear preferably formed integral with the bracket 37 and provided with a screw-threaded opening to receive a bolt 42. The ear 41 is preferably mounted upon bracket 37, and I have so shown it; but of course its operation would be the same if mounted upon bracket 38. The shank 39 of the shovel 40 being passed through the opening in the brackets 37 38 is held in position by screwing in the bolt 42 until by its pressure it bears against the shank 39, as is shown in Fig. 5, with sufficient force to hold the same tightly in place.

It is obvious that the shank 39 may be adjusted vertically in the brackets 37 38, and by means of the adjustable features of the plate 31 above described the angle at which the shovels 40 enter the ground may be varied to suit the demands of the operator.

I claim—

1. In a cultivator, the combination with a frame and a shovel-beam pivotally suspended therefrom, of an upright carried by said frame, a rock-lever mounted on said upright, a rod connecting one arm of said lever with said shovel-beam, and a rod and a spring connected at their upper ends to opposite arms of said rock-lever and at their lower ends to an intermediate movable member, substantially as described.

2. In a cultivator, the combination with a frame and a shovel-beam pivotally suspended therefrom, of an upright carried by said frame, a rock-lever mounted on said upright, a rod connecting one arm of said lever with said shovel-beam, a rod and a spring connected at their upper ends to opposite arms of said rock-lever, and a movable member pivotally mounted on said upright and connected with the lower ends of said rod and spring respectively, substantially as described.

3. In a cultivator, the combination with a frame and a shovel-beam pivotally suspended therefrom, of an upright carried by said frame, a rock-lever mounted on said upright, a rod connecting one arm of said lever with said shovel-beam, and a rod and a spring connected at their upper ends to opposite arms of said rock-lever and at their lower ends to a pair of intermeshing cog-segments mounted on said upright, substantially as described.

4. In a cultivator, the combination with a frame and a shovel-beam pivotally suspended therefrom, of an upright carried by said frame, a rock-lever mounted on said upright, a rod connecting one arm of said lever with said shovel-beam, a rod and a spring connected at their upper ends to opposite arms of said rock-lever, and two intermediate cog-levers pivotally mounted on said upright and connected respectively with the lower ends of said rod and said spring, substantially as described.

5. In a cultivator, the combination with a shovel-beam, of a plate 29 provided with notched segments 30 and mounted on said shovel-beam, of a slotted plate 31 pivotally mounted on said shovel-beam and provided with a notched segment adapted to engage said notched segment 30 and having perforated brackets 37 38, a bolt passing through a slot in said plate 31 and adapted to hold said plates 29 and 31 in engagement, a shovel-shank fitted in the perforated brackets, an ear formed on one of said brackets, and a set-screw fitted in the ear and adjustably holding the shovel-shank in the bracket, substantially as described.

JAMES H. PATTEE.

Witnesses:
CHAS. A. PERLEY,
ISAIAH S. WOLF.